United States Patent
Hande et al.

(10) Patent No.: US 10,824,180 B2
(45) Date of Patent: Nov. 3, 2020

(54) SYSTEMS AND METHODS FOR IMPROVING CURRENT SHARING BETWEEN PARALLELED DC-TO-DC POWER CONVERTERS BASED ON TEMPERATURE COEFFICIENT

(71) Applicant: ABB Power Electronics Inc., Plano, TX (US)

(72) Inventors: Abhiman Ananthakrishna Hande, Plano, TX (US); Richard Paul Massetti, Jr., McKinney, TX (US); Mark Andrew Dubecky, McKinney, TX (US)

(73) Assignee: ABB Power Electronics Inc., Plano, TX (US)

( * ) Notice: Subject to any disclaimer, the term of this patent is extended or adjusted under 35 U.S.C. 154(b) by 0 days.

(21) Appl. No.: 15/888,847

(22) Filed: Feb. 5, 2018

(65) Prior Publication Data

US 2019/0243398 A1 Aug. 8, 2019

(51) Int. Cl.
| | |
|---|---|
| *G05F 1/46* | (2006.01) |
| *G01K 1/02* | (2006.01) |
| *G01K 13/00* | (2006.01) |
| *H02M 1/32* | (2007.01) |
| *H02M 1/00* | (2006.01) |
| *H02M 3/158* | (2006.01) |

(52) U.S. Cl.
CPC ............... *G05F 1/46* (2013.01); *G01K 1/026* (2013.01); *G01K 13/00* (2013.01); *H02M 1/32* (2013.01); *H02M 3/1584* (2013.01); *H02M 2001/0025* (2013.01); *H02M 2001/327* (2013.01)

(58) Field of Classification Search
CPC . G05F 1/46; G05F 3/222; G05F 3/225; G05F 3/245; G01K 1/026; G01K 13/00; H02M 1/32; H02M 2001/0025; H02M 2001/327; H02M 3/1584
See application file for complete search history.

(56) References Cited

U.S. PATENT DOCUMENTS 6,084,790 A  7/2000 Wong
6,449,174 B1  9/2002 Elbanhawy
(Continued)

FOREIGN PATENT DOCUMENTS

WO  2003085476 A1  10/2003

OTHER PUBLICATIONS

Written opinion for PCT application No. PCT/US2019/016612, dated Aug. 2, 2019 (8 pages).
(Continued)

*Primary Examiner* — Shawki S Ismail
*Assistant Examiner* — Demetries A Gibson
(74) *Attorney, Agent, or Firm* — Barnes & Thornburg LLP

(57) ABSTRACT

A DC-to-DC power converter includes a reference voltage generator and a tangible, non-transitory, computer-readable memory. The memory stores a temperature coefficient, and the temperature coefficient is based upon a temperature response of said reference voltage generator over a range of temperatures. The DC-to-DC power converter also includes a controller coupled to the reference voltage generator and the memory and operable to retrieve the temperature coefficient from the memory, and adjust an output voltage of the DC-to-DC power converter based upon the temperature coefficient.

14 Claims, 4 Drawing Sheets

(56) References Cited

U.S. PATENT DOCUMENTS

| | | | |
|---|---|---|---|
| 6,646,425 B2 | 11/2003 | Miftakhutdinov | |
| 8,378,657 B2 | 2/2013 | Dobkin | |
| 9,128,497 B2 | 9/2015 | Li | |
| 9,504,103 B2 | 11/2016 | Denvir | |
| 9,515,558 B2 | 12/2016 | Zheng | |
| 9,739,669 B2 | 8/2017 | Susak | |
| 9,762,146 B2 | 9/2017 | Schulz | |
| 9,985,439 B2* | 5/2018 | Abido | H02J 3/381 |
| 2001/0017234 A1* | 8/2001 | Suga | B66B 1/30 |
| | | | 187/290 |
| 2004/0075600 A1* | 4/2004 | Vera | H02J 1/102 |
| | | | 341/166 |
| 2005/0024035 A1 | 2/2005 | Tabaian et al. | |
| 2011/0025292 A1 | 2/2011 | Huang et al. | |
| 2013/0188399 A1* | 7/2013 | Tang | H02M 3/335 |
| | | | 363/21.1 |
| 2014/0139229 A1* | 5/2014 | Kassayan | H04W 4/70 |
| | | | 324/426 |
| 2014/0312857 A1 | 10/2014 | Zheng et al. | |
| 2015/0200595 A1* | 7/2015 | Xiang | H02M 3/33507 |
| | | | 363/15 |
| 2015/0249391 A1* | 9/2015 | Yang | H02M 3/33576 |
| | | | 363/21.01 |
| 2017/0025950 A1* | 1/2017 | Wu | H02M 3/1584 |
| 2018/0115287 A1* | 4/2018 | Rabjohn | H03G 3/3042 |

OTHER PUBLICATIONS

International search report for PCT application No. PCT/US2019/016612, dated Aug. 2, 2019 (4 pages).

\* cited by examiner ated without the use of a temperature coefficient; and
SYSTEMS AND METHODS FOR IMPROVING CURRENT SHARING BETWEEN PARALLELED DC-TO-DC POWER CONVERTERS BASED ON TEMPERATURE COEFFICIENT

BACKGROUND

The field of disclosure relates generally to systems and methods for improving current sharing between parallel connected DC-to-DC power converters. More particularly, the field of disclosure relates to systems and methods for improving current sharing between parallel connected DC-to-DC power converters, in which a temperature coefficient is added to a control loop of each converter to regulate the output voltage of each converter over a range of temperatures.

DC-to-DC power converters are used throughout the electronics industry and are designed to convert an input direct current (DC) voltage to a higher or lower output DC voltage. Such converters typically rely upon a reference voltage derived from an onboard component, such as a low-dropout ("LDO") regulator, for control and regulation of the output voltage. However, the performance of such reference voltage generators may vary non-uniformly (e.g., part-to-part) as a function of temperature, such that several otherwise identical DC-to-DC power converters may generate different output voltages at the same temperature.

In many cases, such part-to-part variations in output voltage are not problematic. For example, loads powered by a single DC-to-DC converter may not suffer from small variations in output voltage. However, systems that rely upon a plurality of parallel connected (i.e., "paralleled") converters may be adversely affected, such as, for example, where one converter attempts to supply greater than its share of power to a load—a condition which may occur when the output voltages of several paralleled converters are non-uniformly affected by a change in temperature. In such a case, the converter attempting to oversupply the load may rapidly approach an overcurrent protection limit and/or an over-temperature protection limit, at which point the converter may power off (e.g., in a failsafe mode), interrupting power to the load.

The impact of temperature on performance may be exacerbated by an industry trend towards compact and power dense converter architectures. For example, as power converters are simultaneously made smaller and more powerful, the impact of additional waste heat may contribute, in greater proportion, to the drawbacks described above. This issue may worsen at elevated ambient temperatures and/or in applications without adequate air flow. In particular, such conditions may cause high density power supplies to operate at elevated temperatures where there is a possibility of wide variation between each converter's output voltage.

Systems and methods for improving current sharing between paralleled DC-to-DC converters are therefore desirable. More particularly, systems and methods for improving current sharing are desirable, in which a temperature coefficient is added to a control loop of each converter to regulate the output voltage of each converter over a range of temperatures.

BRIEF DESCRIPTION

In one aspect, a DC-to-DC power converter is provided. The DC-to-DC power converter includes a reference voltage generator and a tangible, non-transitory, computer-readable memory. The memory stores a temperature coefficient based upon a temperature response of said reference voltage generator over a range of temperatures. The DC-to-DC power converter also includes a controller coupled to the reference voltage generator and the memory and operable to retrieve the temperature coefficient from the memory, and adjust an output voltage of the DC-to-DC power converter based upon the temperature coefficient.

In another aspect, a DC-to-DC power converter is provided. The DC-to-DC power converter includes a temperature sensor that generates a temperature sense signal indicative of a temperature of the DC-to-DC power converter, and a reference voltage generator that generates a reference voltage. The DC-to-DC power converter also includes a tangible, non-transitory, computer-readable memory that stores a temperature coefficient, and a controller. The controller is coupled to the temperature sensor, the reference voltage generator, and the memory, and is operable to receive the temperature sense signal, receive the reference voltage, retrieve the temperature coefficient from the memory, and control the DC-to-DC power converter based upon the temperature sense signal, the reference voltage, and the temperature coefficient.

In yet another aspect, a system of paralleled DC-to-DC power converters is provided. The system includes a first DC-to-DC power converter and a second DC-to-DC power converter. The first DC-to-DC power converter includes a first controller operable to adjust an output voltage of the first DC-to-DC power converter based upon a first temperature coefficient. The second DC-to-DC power converter includes a second controller operable to adjust an output voltage of the second DC-to-DC power converter based upon a second temperature coefficient.

DRAWINGS

These and other features, aspects, and advantages of the present disclosure will become better understood when the following detailed description is read with reference to the accompanying drawings in which like characters represent like parts throughout the drawings, wherein.

Figure 1:
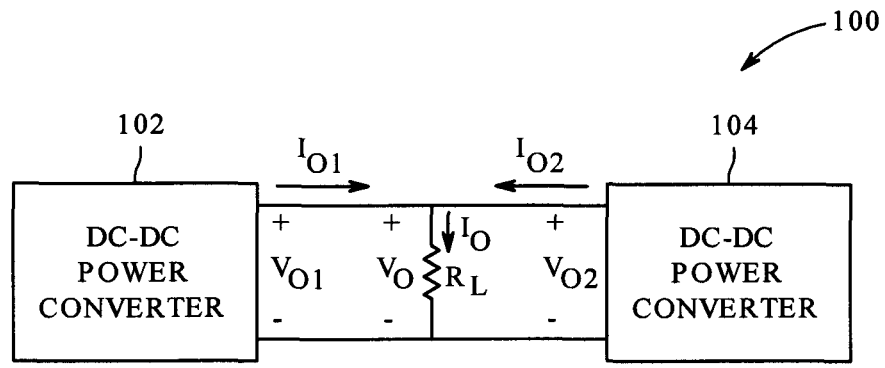
FIG. 1 is a block diagram of a plurality of parallel connected (or "paralleled") DC-to-DC power converters.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor," "controller," "microcontroller," "computer," and related terms (e.g., "processing device," "computing device") are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, "droop" current sharing refers to an arrangement of parallel connected DC-to-DC power converters in which the output voltage of at least one power converter in the arrangement is adjusted based upon a predefined "droop" coefficient. Specifically, the droop coefficient may be selected, such that current to a load is provided by, or shared between, each of the parallel connected power converters. If one of the power converters attempts to provide more current to the load, its output voltage may "droop" or decrease slightly as a result of the droop coefficient, such that the total current drawn by the load is distributed more evenly between the plurality of converters.

As used herein, "active" current sharing refers to an arrangement of parallel connected DC-to-DC power converters in which a droop coefficient is excluded in favor of a comparison between each power converter output current and the desired average current to be supplied to the load. Specifically, each power converter output voltage in an arrangement of parallel connected power converters is supplied to a feedback loop, and the output voltage of each power converter is adjusted based upon a difference between its actual measured output current and the desired average current required to be supplied to the load.

Embodiments of the present disclosure relate to systems and methods for improving current sharing between parallel connected (or "paralleled") DC-to-DC power converters. More particularly, a predefined temperature coefficient is added to a control loop of each converter in a plurality of paralleled DC-to-DC power converters. During operation, the addition of each temperature coefficient to a respective control loop results in a uniform output voltage response (e.g., a uniform change in output voltage) by each power converter. Specifically, in at least some embodiments, the output voltage of each power converter changes by substantially the same amount in response to a change in temperature. As a result, no single power converter in the arrangement of paralleled power converters is able to oversupply a given load as a result of change in temperature. Rather, each power converter contributes power in equal measure to the load, such that no power converter trips or otherwise enters a failsafe mode.

FIG. 1 is a block diagram of a system 100 of parallel connected DC-to-DC power converters. Specifically, FIG. 1 shows a first DC-to-DC power converter 102 connected in parallel with a second DC-to-DC power converter 104. First power converter 102 generates a first output voltage, $V_{o1}$, and supplies a first output current, $I_{o1}$, to a load, $R_L$. Likewise, second power converter 104 generates a second output voltage, $V_{o1}$, and supplies a second output current, $I_{o2}$, to the load, $R_L$. A voltage drop across the load, $R_L$, is denoted $V_o$, and electrical current supplied to the load is denoted $I_o$. Power is supplied to the load, $R_L$, by both power converters 102 and 104. Thus, the current to the load, $I_o=I_{o1}+I_{O2}$. As described below, converters 102 and 104 may operate in a variety of modes, such as droop sharing and active current sharing modes. In both modes, one or more temperature coefficients are added to a control loop (or loops) to compensate for a temperature change of power converters 102 and/or 104.

Figure 2:
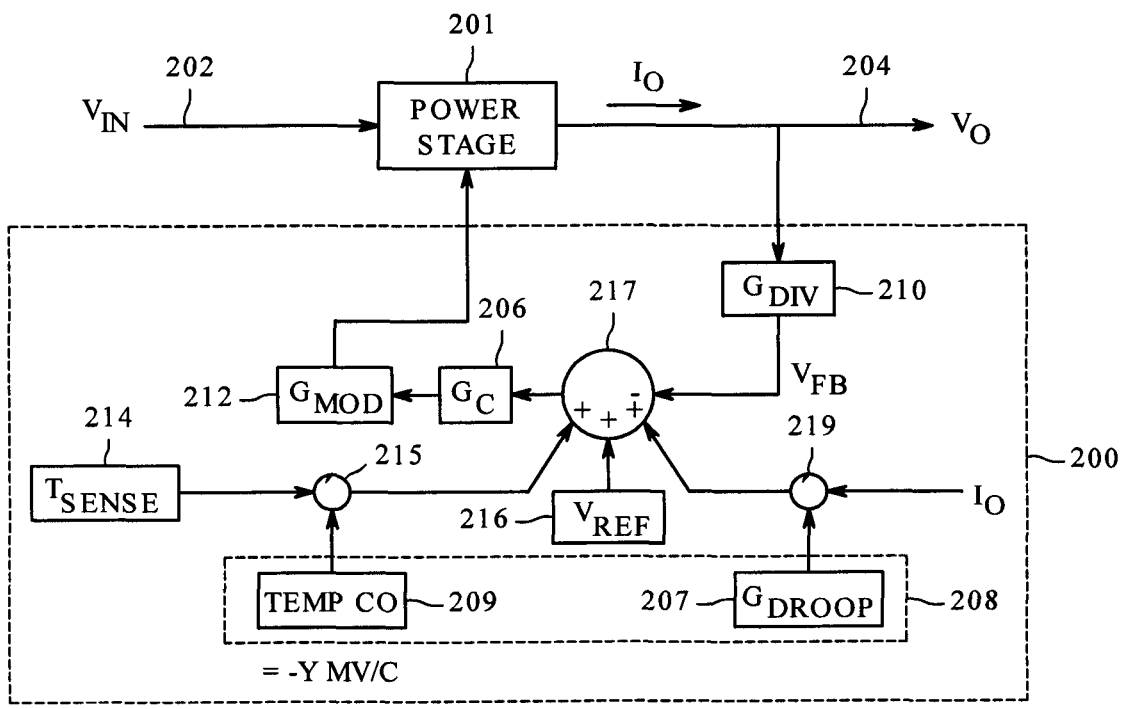
FIG. 2 is a block diagram of a control circuit for adjusting an output voltage of a DC-to-DC power converter in a droop current sharing mode based on one or more temperature coefficients.

FIG. 2 is a block diagram of a control circuit 200 for adjusting an output voltage of a DC-to-DC power converter, such as first power converter 102, in a droop current sharing mode and based upon a temperature coefficient. However, either, or both, of power converter 102 and/or power converter 104 may implement droop current sharing based on temperature coefficient.

Control circuit 200 is implemented as a control loop, such as a negative feedback control loop, between an input voltage bus 202 and an output voltage bus 204 of a power stage 201 (e.g., a boost converter) of power converter 102. To this end, control circuit 200 includes a controller 206 and a computer-readable memory 208. In various embodiments, memory 208 is any suitable tangible, non-transitory, computer-readable memory, such as any EEPROM of power converter 102.

Controller 206 may read one or more computer executable instructions stored in memory 208 to implement one or more control algorithms, such as one or more proportional-integral-derivative (PID) control algorithms. In addition, controller 206 may retrieve one or more coefficients, such as one or more droop coefficients and/or one or more temperature coefficients, from memory 208. Specifically, memory 208 may store a droop coefficient 207 associated with power converter 102 and/or a temperature coefficient 209 associated with power converter 102.

In the exemplary embodiment, control circuit 200 also includes a voltage divider 210, a modulation circuit 212, a temperature sensor 214, and a reference voltage generator 216. Voltage divider 210 is electrically coupled between output voltage bus 204 and controller 206 and establishes a feedback voltage, $V_{fb}$, of power converter 102. Modulation circuit 212 may include any circuit configured to generate a pulse width modulated (PWM) signal, the duty cycle of which may be varied or adjusted to vary or adjust an output power of power converter 102.

Temperature sensor 214 may include any suitable temperature sensor configured to output a temperature sense signal, $T_{sense}$, indicative of a temperature of power converter 102. Reference voltage generator 216 is any suitable reference voltage generator configured to generate a reference voltage, $V_{ref}$, such as, for example, a low dropout regulator (LDO) and/or a separate and/or dedicated reference voltage generator. Several summing points, such as a first summing point 215, a second summing point 217, and a third summing point 219, are also shown. However, those of skill will appreciate that operations associated with summing points 215-219 (e.g., additions, multiplications, and/or subtractions) are performed by controller 206.

Accordingly, and in operation, controller 206 receives a plurality of variables, such as, for example, a feedback voltage, $V_{fb}$, a reference voltage, $v_{ref}$, a temperature sense signal, $t_{sense}$, droop coefficient 207, and/or temperature coefficient 209. In addition, controller 206 implements a control algorithm, such as a PID control algorithm, based upon the one or more variables, and adjusts or controls an output voltage, such as $V_{O1}$ of power converter 102. For example, in some embodiments, controller 206 calculates a modified error value, e(t), which may be provided as an input to the PID control algorithm. Specifically, the modified error value, e(t), may be calculated, in a droop current sharing mode, as follows: $e(t)=V_{ref}-V_{fb}+(G_{dROOp}*I_o)+(TempCo*T_{sense})$, where $V_{ref}$ is the reference voltage, $V_{fb}$ is a feedback voltage, $b_{droop}$ is droop coefficient 207, $I_o$ is an output current of power converter 102, TempCo is temperature coefficient 209, and $T_{sense}$ is the temperature sense signal. In some embodiments, droop coefficient 207 and $I_o$ may be excluded from the calculation, such that $e(t)=V_{ref}-V_{fb}+(TempCo*T_{sense})$.

Temperature coefficient 209 is individually determined for a particular power converter 102 and/or 104 and includes an initial value and a calibrated value. Specifically, an initial value of temperature coefficient 209 may be set for a particular power converter 102 and/or 104 based upon one or more physical and/or performance characteristics of the particular power converter 102 and/or 104. For example, a negative temperature coefficient can be selected so that power converters operating at slightly higher current will have a higher negative voltage added to their reference voltage, resulting in a lower reference voltage and consequently, lower output voltage due to negative feedback. This, in turn, results in reduction in their current. In various embodiments, such a egative temperature coefficient is selected based on application requirements.

In various embodiments, temperature coefficient 209 is also a negative value, such as, for example, any negative value that may be added by controller 206 to the PID control algorithm to reduce the output current supplied by a parallel connected power converter 102 and/or 104 to the load, $R_L$. For example, in at least one embodiment, temperature coefficient 209 has a value of −0.6 millivolts/degree Celsius (mV/C).

In addition to the initial value of temperature coefficient 209, a calibrated value may be identified or determined, such as, for example, on a converter-by-converter basis. In other words, each power converter 102 and 104 of a plurality of parallel connected power converters 102 and 104 may undergo a calibration procedure to identify a calibrated value of temperature coefficient 209. Specifically, the calibration procedure may include exposing a selected power converter to a range of temperatures, such as a range of anticipated operating temperatures. The output voltage of the selected power converter may be observed over the range of temperatures, and a calibrated temperature coefficient identified to achieve a desired output voltage response. Either and/or both of the initial value and/or the calibrated value of temperature coefficient 209 may be stored in memory 208, such as, for example, by way of a firmware installation and/or update.

Figure 3:
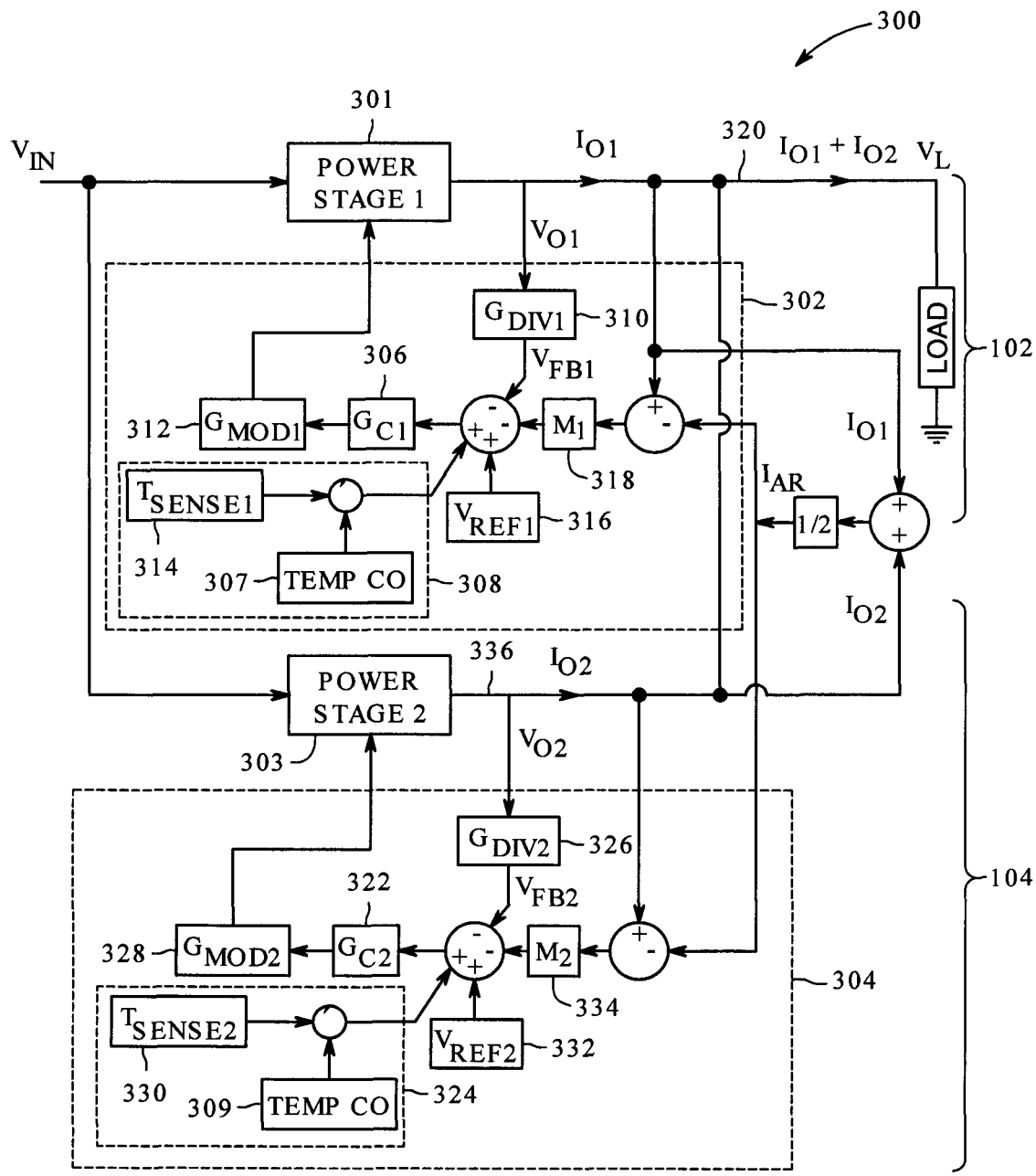
FIG. 3 is a block diagram of a control circuit for adjusting an output voltage of a DC-to-DC power converter in an active current sharing mode based on one or more temperature coefficients.

FIG. 3 is a block diagram of a control circuit 300 for adjusting an output voltage of a plurality of parallel connected DC-to-DC power converters 102 and 104 in an active current sharing mode and based upon one or more temperature coefficients. In the exemplary embodiment, first power converter 102 and second power converter 104 are arranged as described above, except that a droop coefficient is not added to the control loop of each power converter 102 and 104. Rather, power converters 102 and 104 are electrically connected in an active current sharing topology, such that an average current to the load, $I_{avg}$, is calculated and added to a feedback loop of each power converter 102 and 104.

Accordingly, control circuit 300 includes a first control loop 302 associated with first power converter 102 and a second control loop 304 associated with second power converter 104. Specifically, first control loop 302 electrically couples to a first power stage 301, as described above. Likewise, second control loop 304 electrically couples to a second power stage 303.

First control loop 302 includes a first controller 306 and a first computer-readable memory 308. In various embodiments, first memory 308 is any suitable tangible, non-transitory, computer-readable memory, such as any EEPROM of first power converter 102. As described above, first controller 306 may read one or more computer executable instructions stored in first memory 308 to implement one or more control algorithms, such as one or more PID control algorithms. In addition, first controller 306 may retrieve one or more temperature coefficients, such as a first temperature coefficient 307, from first memory 308.

First control loop 302 also includes a first voltage divider 310, a first modulation circuit 312, a first temperature sensor 314, a first reference voltage generator 316, and/or a first gain block 318. First voltage divider 310 is electrically coupled between a first output voltage bus 320 and first controller 306 and establishes a first feedback voltage, $V_{fb1}$, of first power converter 102. First modulation circuit 312 may include any circuit configured to generate a PWM signal, the duty cycle of which may be varied or adjusted to vary or adjust an output power of first power converter 102.

First temperature sensor 314 may include any suitable temperature sensor configured to output a first temperature sense signal, $T_{sense1}$, indicative of a temperature of first power converter 102. First reference voltage generator 316 is any suitable reference voltage generator configured to generate a first reference voltage, $V_{ref1}$, such as, for example, a low dropout regulator (LDO) and/or a separate and/or dedicated reference voltage generator. Several summing points are also shown. However, and as described above, those of skill will appreciate that operations associated with summing points (e.g., additions, multiplications, and/or subtractions) are performed by a controller, such as first controller 306.

Second control loop 304 includes a second controller 322 and a second computer-readable memory 324. In various embodiments, second memory 324 is any suitable tangible, non-transitory, computer-readable memory, such as any EEPROM of second power converter 104. As described above, second controller 322 may read one or more computer executable instructions stored in second memory 324 to implement one or more control algorithms, such as one or more PID control algorithms. In addition, second controller 322 may retrieve one or more temperature coefficients, such as a second temperature coefficient 309, from second memory 324.

Second control loop 304 also includes a second voltage divider 326, a second modulation circuit 328, a second temperature sensor 330, a second reference voltage generator 332, and/or a second gain block 334. Second voltage divider 326 is electrically coupled between a second output voltage bus 336 and second controller 322 and establishes a second feedback voltage, $V_{fb2}$, of second power converter 104. Second modulation circuit 328 may include any circuit configured to generate a PWM signal, the duty cycle of which may be varied or adjusted to vary or adjust an output power of second power converter 104.

Second temperature sensor 330 may include any suitable temperature sensor configured to output a second temperature sense signal, $T_{sense2}$, indicative of a temperature of second power converter 104. Second reference voltage generator 332 is any suitable reference voltage generator configured to generate a second reference voltage, $V_{ref2}$, such as, for example, a low dropout regulator (LDO) and/or a separate and/or dedicated reference voltage generator. Several summing points are also shown. However, and as described above, those of skill will appreciate that operations associated with summing points (e.g., additions, multiplications, and/or subtractions) are performed by a controller, such as second controller 322.

In operation, first controller 306 and second controller 322 receive a plurality of variables, such as, for example, one or more reference voltages (e.g., $V_{ref1}$ and/or $V_{ref2}$), one or more temperature coefficients (e.g., temperature coefficients 307 and/or 309), one or more feedback voltages ($V_{fb1}$ and/or $V_{fb2}$), one or more temperature sense signals ($T_{sense1}$ and/or $T_{sense2}$), and/or an average current to the load ($I_{avg}$). In addition, first controller 306 and second controller 322 implement control algorithms, such as PID control algorithms, based upon the one or more variables, to adjust or control an output voltage and/or an output current of each of the first power converter 102 and second power converter 104.

For example, in some embodiments, first controller 306 and/or second controller 322 may calculate a modified error value, e(t), which is provided as an input to a PID control algorithm implemented by one of the controllers 306 and/or 322, respectively. For example, a modified error value may be calculated by either controller 306 and/or 322 for a droop current sharing mode or an active current sharing mode. The calculation for a droop current sharing mode is described above.

In an active current sharing mode, a first modified error value, e1(t), may be calculated, by first controller 306, as follows: $e1(t)=V_{ref1}-V_{fb1}-[M_1*(I_{o1}-I_{av})]+(TempCo1*T_{sense1})$, where $V_{ref1}$ is the first reference voltage, $V_{fb1}$ is the first feedback voltage, $M_1$ is a gain of first gain block 318, $I_{o1}$ is the output current of first converter 102, $I_{av}$ is the average output current of first converter 102 and second converter 104, TempCo1 is first temperature coefficient 307, and $T_{sense1}$ is the first temperature sense signal. Similarly, in the active current sharing mode, a second modified error value, e2(t) may be calculated, by second controller 322, as follows: $e2(t)=V_{ref2}-V_{fb2}-[M_2*(I_{o2}-I_{av})]+(TempCo2*T_{sense2})$, where $V_{ref2}$ is the second reference voltage, $V_{fb2}$ is the second feedback voltage, $M_2$ is a gain of second gain block 334, $I_{o2}$ is the output current of second converter 104, $I_{av}$ is the average output current of first converter 102 and second converter 104, TempCo2 is second temperature coefficient 309, and $T_{sense2}$ is the second temperature sense signal.

One or more predefined temperature coefficients may thus be added to the control loops of one or more parallel connected power converters to bring the output voltages of each converter closer together. For example, and with reference now to FIGS. 4 and 5, graphs illustrating load regulation curves of a plurality of converters without, and with, the addition of a temperature coefficient, respectively, are shown. Specifically, FIG. 4 is a graph 400 illustrating an exemplary variation in the output voltages of a plurality of power converters regulated without the use of one or more temperature coefficients, and FIG. 5 is a graph 500 illustrating an exemplary variation in the output voltages of a plurality power converters regulated with the use of one or more temperature coefficients.

Figure 4:
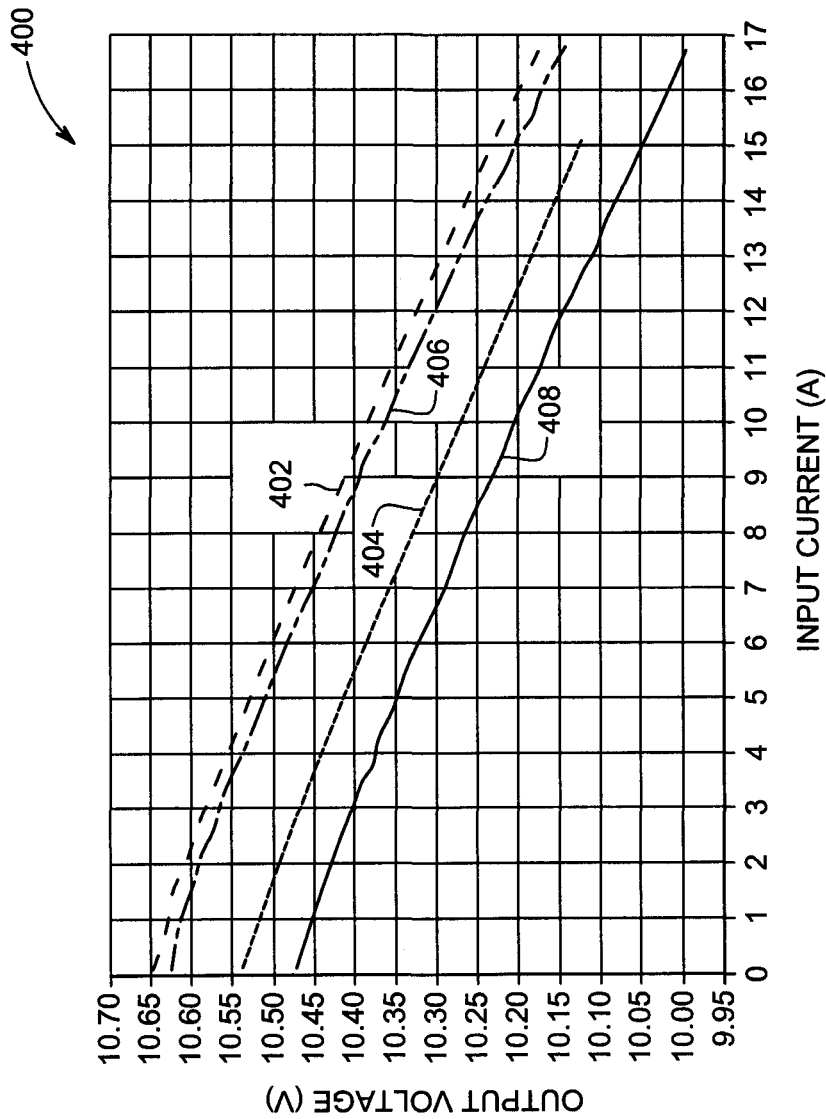
FIG. 4 is a graph illustrating an exemplary variation in the output voltages of a plurality of power converters regulated without the use of a temperature coefficient.
Figure 5:
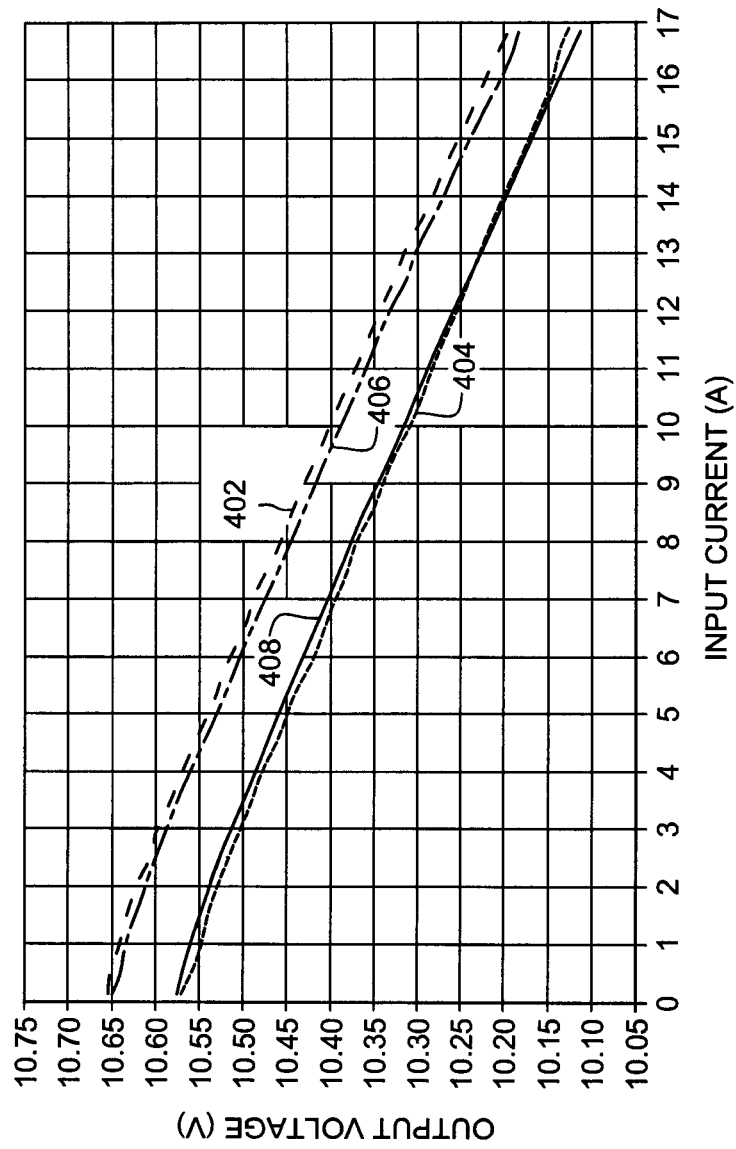
FIG. 5 is a graph illustrating an exemplary variation in the output voltages of a plurality power converters regulated with the use of a temperature coefficient.

Accordingly, and with reference to FIG. 4, a first voltage curve 402 is shown for a first power converter at 25 degrees Celsius, and a second voltage curve 404 is shown for the first power converter at 105 degrees Celsius. Likewise, a third voltage curve 406 is shown for a second power converter at 25 degrees Celsius, and a fourth voltage curve 408 is shown for the second power converter at 105 degrees Celsius. As described above, a temperature coefficient is not added to the feedback loops of either the first or second power converter, resulting, as shown, in a gap or difference in output voltage between the first and second power converters that increase as temperature increases. Specifically, the difference between output voltages of the first and second power converter at 105 degrees Celsius is greater than the difference between their respective output voltages at 25 degrees Celsius.

Therefore, to reduce the difference between the output voltages (or output voltage responses) of a plurality of parallel connected power converters (as described above) one or more temperature coefficients may be added to the control loops of each power converter. The output voltage responses of the first and second converters described with reference to FIG. 4 are shown at FIG. 5 with the addition of a temperature coefficient to the control loop of each converter. As shown, with the addition of temperature coefficient to the control algorithm, the output voltages of the first and second power converter are much closer together. Specifically, it can be seen that first voltage curve 402 of the first power converter at 25 degrees Celsius is very close to third voltage curve 406 of the second power converter at the same temperature. Likewise, it can be seen that second voltage curve 404 of the first power converter at 105 degrees Celsius is very close to fourth voltage curve 408 of the second power converter at the same temperature.

Embodiments of the present disclosure thus relate to systems and methods for improving current sharing between parallel connected DC-to-DC power converters. More particularly, a predefined temperature coefficient is added to a control loop of each converter in a plurality of parallel connected DC-to-DC power converters. During operation, the addition of each temperature coefficient to a respective control loop results in a uniform output voltage response (e.g., a uniform change in output voltage) by each power converter. Specifically, in at least some embodiments, the output voltage of each power converter changes by substantially the same amount in response to a change in temperature. As a result, no single power converter in the arrangement of paralleled power converters is able to oversupply a given load as a result of temperature. Rather, each power converter contributes power in equal measure to the load, such that no power converter trips or otherwise enters a failsafe mode.

Exemplary technical effects of the systems and methods described herein include, for example: (a) addition of a temperature coefficient to a control loop of a DC-to-DC power converter to compensate for changes in temperature of the converter; (b) addition of a plurality of temperature coefficients to the control loops of a plurality of parallel connected DC-to-DC power converters to ensure a uniform response to temperature by each converter; (c) reduction or elimination of one or more failsafe modes (e.g., overcurrent, over-temperature, and/or overvoltage modes) in response to changes in temperature; and (d) steady, reliable, power delivery to a load by a plurality of parallel connected DC-to-DC power converters irrespective of temperature.

Exemplary embodiments of a DC-to-DC power converter and related components are described above in detail. The converter is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where DC-to-DC power conversion is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A DC-to-DC power converter comprising:
   a tangible, non-transitory, computer-readable memory storing a calibrated temperature coefficient associated with the DC-to-DC power converter, the calibrated temperature coefficient based upon output voltage responses of the DC-to-DC power converter over a range of operating temperatures, wherein the calibrated temperature coefficient indicates an amount of an output voltage shift per degree Celsius; and
   a controller coupled to said memory, said controller comprising a proportional-integral-derivative (PID) controller, said controller configured to:
   retrieve the calibrated temperature coefficient from said memory;
   adjust an output voltage of said DC-to-DC power converter based upon the calibrated temperature coefficient; and
   calculate a modified error value, e(t), for use with a PID control algorithm, the modified error value calculated as follows: e(t)=Vref−Vfb+(TempCo*Tsense), where Vref is a reference voltage, Vfb is a feedback voltage, TempCo is the calibrated temperature coefficient, and Tsense is a temperature sense signal indicative of a temperature of said DC-to-DC power converter.

2. The DC-to-DC power converter of claim 1, further comprising a reference voltage generator operable to generate the reference voltage, wherein said controller is further operable to adjust the output voltage of said DC-to-DC power converter based upon the reference voltage.

3. The DC-to-DC power converter of claim 1, wherein said controller is further operable to adjust the output voltage of said DC-to-DC power converter based upon a temperature of said DC-to-DC power converter.

4. The DC-to-DC power converter of claim 1, wherein said controller is further operable to retrieve a droop coefficient from said memory, and adjust the output voltage of said DC-to-DC power converter based upon the droop coefficient.

5. The DC-to-DC power converter of claim 1, wherein said controller is further operable to adjust the output voltage of said DC-to-DC power converter without a droop coefficient based upon an average of an output current of said DC-to-DC power converter and an output current of another DC-to-DC power converter electrically connected in parallel with said DC-to-DC power converter.

6. The DC-to-DC power converter of claim 1, wherein the calibrated temperature coefficient has a negative value.

7. A DC-to-DC power converter comprising:
   a temperature sensor operable to generate a temperature sense signal indicative of a temperature of said DC-to-DC power converter;
   a reference voltage generator operable to generate a reference voltage;
   a tangible, non-transitory, computer-readable memory storing a temperature coefficient associated with the DC-to-DC power converter, the temperature coefficient based upon output voltage responses of the DC-to-DC power converter over a range of operating temperatures; and
   a controller coupled to said temperature sensor, said reference voltage generator, and said memory, said controller comprising a proportional-integral-derivative (PID) controller, said controller operable to:
   receive the temperature sense signal;
   receive the reference voltage;

retrieve the temperature coefficient from said memory;

control said DC-to-DC power converter based upon the temperature sense signal, the reference voltage, and the temperature coefficient; and calculate a modified error value, e(t), for use with a PID control algorithm, the modified error value calculated as follows: e(t)=Vref−Vfb+(TempCo*Tsense), where Vref is the reference voltage, Vfb is a feedback voltage, TempCo is the temperature coefficient, and Tsense is the temperature sense signal.

8. The DC-to-DC power converter of claim 7, wherein the temperature coefficient has a negative value.

9. The DC-to-DC power converter of claim 7, wherein said controller is further operable to adjust the output voltage of said DC-to-DC power converter based upon an average of an output current of said DC-to-DC power converter and an output current of another DC-to-DC power converter electrically connected in parallel with said DC-to-DC power converter.

10. A system of paralleled DC-to-DC power converters, said system comprising:

a first DC-to-DC power converter comprising a first controller operable to adjust an output voltage of said first DC-to-DC power converter based upon a first temperature coefficient associated with the first DC-to-DC power converter, the first temperature coefficient based upon output voltage responses of the first DC-to-DC power converter over a range of temperatures, wherein the first controller is further operable to calculate a first modified error value, e1(t), for use with a proportional-integral-derivative (PID) control algorithm, the first modified error value calculated as follows: e1(t)=Vref1−Vfb1−[M1*(Io1−Iav)]+(TempCo1*Tsense1), where Vref1 is the first reference voltage, Vfb1 is the first feedback voltage, M1 is a gain of a first gain block, Io1 is the output current of the first DC-to-DC power converter, TempCo1 is the first temperature coefficient, and Tsense1 is the first temperature sense signal; and a second DC-to-DC power converter comprising a second controller operable to adjust an output voltage of said second DC-to-DC power converter based upon a second temperature coefficient associated with the second DC-to-DC power converter, the second temperature coefficient based upon output voltage responses of the second DC-to-DC power converter over a range of temperatures, wherein the second temperature coefficient is different from the first temperature coefficient, wherein the second controller is further operable to calculate a second modified error value, e2(t), for use with a PID control algorithm, the second modified error value calculated as follows: e2(t)=Vref2−Vfb2−[M2*(Io2−Iav)]+(TempCo2*Tsense2), where Vref2 is the second reference voltage, Vfb2 is the second feedback voltage, M2 is a gain of a second gain block, Io2 is the output current of the second DC-to-DC power converter, TempCo2 is the second temperature coefficient, and Tsense2 is the second temperature sense signal.

11. The system of claim 10, wherein said first controller is further operable to adjust the output voltage of said first DC-to-DC power converter based upon a first reference voltage, a first feedback voltage, and a first temperature sense signal that indicates a temperature of said first DC-to-DC power converter.

12. The system of claim 11, wherein said first controller is further operable to adjust the output voltage of said first DC-to-DC power converter based upon a droop coefficient.

13. The system of claim 11, wherein said first controller is further operable to adjust the output voltage of said first DC-to-DC power converter, without the use of droop control, based upon an average of an output current of said first DC-to-DC power converter and an output current of said second DC-to-DC power converter.

14. The system of claim 10, wherein said second controller is further operable to adjust the output voltage of said second DC-to-DC power converter based upon a second reference voltage, a second feedback voltage, and a second temperature sense signal that indicates a temperature of said second DC-to-DC power converter.

* * * * *